Jan. 20, 1925. 1,523,587

D. R. DIXON

TIRE FLAP

Filed June 6, 1924

Inventor
Dennis R. Dixon

Patented Jan. 20, 1925.

1,523,587

UNITED STATES PATENT OFFICE.

DENNIS R. DIXON, OF SUFFOLK, VIRGINIA, ASSIGNOR OF ONE-HALF TO WILLIAM REBMAN McGEORGE, OF RICHMOND, VIRGINIA.

TIRE FLAP.

Application filed June 6, 1924. Serial No. 718,383.

*To all whom it may concern:*

Be it known that I, DENNIS R. DIXON, a citizen of the United States, residing at Suffolk, in the county of Nansemond and State of Virginia, have invented certain new and useful Improvements in Tire Flaps, of which the following is a specification.

This invention relates to tire flaps and more particularly to a protective flap adapted to be arranged between the inner tube of an automobile tire and the rim of the wheel and beads of the tire casing.

An important object of the invention is to provide an efficient protection for the inner tube to prevent the latter from becoming abraded or cut by rust on the outer face fo the rim.

A further object of the invention is to provide a tire flap which, under pressure of the inner tube, will form an efficient water seal to prevent water from coming in contact with the inner tube.

A still further object of the invention is to provide a tire flap which will hold the beads of the tire casing in firm engagement with the face of the rim to minimize rim cutting of the casing.

A still further object of the invention is to provide a tire flap having means adapted to engage about the valve stem to form a water seal at that point.

Other objects and advantages of the invention will be apparent during the course of the following description.

In the drawings I have shown one embodiment of the invention. In this showing,

Figure 1:
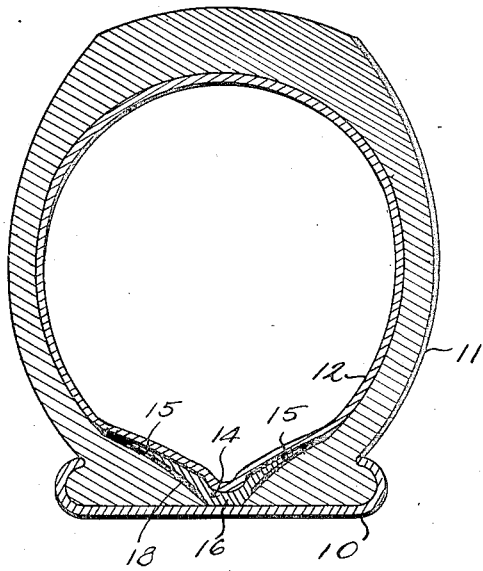
Figure 1 is a transverse sectional view of a rim with a tire in place thereon.

Referring to the drawings the numeral 10 designates an ordinary clincher rim with the usual clincher tire 11 mounted thereon and provided with an inner tube 12 of the usual construction provided with a valve stem 13 whereby the tube may be inflated. While I have shown and described a tire and rim of the clincher type it will be understood that the invention may be applied to other forms of tires and rims used in connection with inner tubes.

Figure 2:
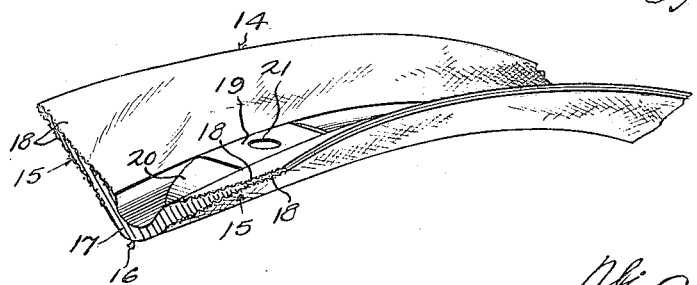
Figure 2 is a fragmentary perspective view of a portion of the flap.
Figure 4:
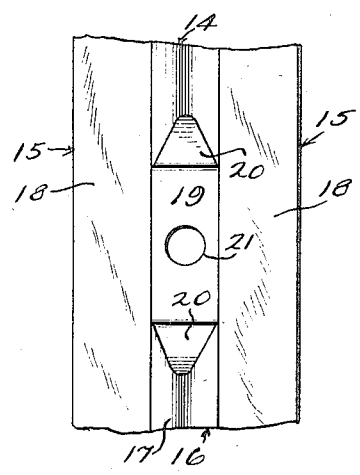
Figure 3:
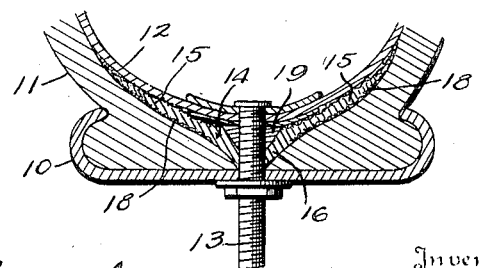
Figure 3 is a fragmentary view similar to Figure 1, showing the arrangement of the valve stem, and, Figure 4 is a fragmentary plan view of a portion of the flap.

The device forming the subject matter of the present invention comprises a substantially V-shaped tire flap designated as a whole by the reference numeral 14 comprising marginal portions 15 and a central portion 16. The flap is formed of a highly flexible rubber body 17 and the marginal portions are covered with suitable fabric strips 18 as clearly shown in Figure 2. The fabric strips terminate at points spaced from the center of the flap as shown and no covering of any kind is provided on either face of the central portion 16 whereby this portion will be highly flexible and elastic under all conditions. The fabric covering 18 of the marginal portions materially reduces the flexibility of these portions and renders the marginal portions nonelastic.

As clearly shown the central portion 16 is curved downwardly and inwardly and is slightly thinner than the body of the rubber adjacent the inner edges of the fabric strips 18 so as to increase the elasticity of the central portion. At one point in its circumference the groove formed by the curve of the central portion 16 is provided with a highly elastic rubber block 19 tapered at its ends as at 20 and suitably vulcanized or otherwise secured to the rubber of the central portion. The block 19 is provided with a substantially central opening 21 of substantially the same diameter as the valve stem 13 for a purpose to be described.

The operation of the device is as follows:

The flap is placed in position within the casing as shown in Figure 1 with the valve stem 13 projecting through the opening 21. The tire is then placed in position on the rim in the usual manner and inflated to the proper pressure. The pressure within the tube seats the marginal portions of the flap tightly against the inner faces of the tire beads and further serves to stretch the rubber of the central portion in such a manner that it snugly fits the angles formed between the inner faces of the beads and the outer face of the rim 10. This action presents an effectual seal against water thus preventing damage to the tire and in the usual manner, the flap protects the inner tube from contact with any rust which may be present on the outer face of the rim.

The provision of the fabric strips adds considerable body to the marginal portions of the rubber strips thus reducing the flexibility of these portions and rendering them non-elastic. Thus, when placing the flap in the tire and mounting the latter on the rim, the shape of the marginal portions is preserved against wrinkling prior to inflating the tire, and pinching of the tire is effectually prevented. The stiffening provided by the fabric strips also permits the flap more easily to be placed in position in the tire.

The pressure within the tube also serves to deform the rubber of the block 19 causing the walls of the opening 21 to grip tightly against the valve stem to provide a leak-proof joint at this point.

I have found that with the ordinary constructions usually employed, the flap does not tightly contact with the beads of the tire at their inner extremities and when passing over stones or other bumps the inward movement of the tread portion of the tire and outward movement of the side walls causes the beads of the tire to rock about the edges of the rim particularly when clincher tires are employed. This action in time causes the inner edges of the rims to cut the tires as is well known. I have found that with the construction herein described the highly flexible central portion of the flap causes constant firm engagement of the inner extremities of the beads of the tire against the rim and prevents rocking of the beads, thus minimizing rim cut.

It is to be understood that the form of my invention herewith shown and described is to be taken as a preferred example of the same and that various changes in the shape, size, and arrangement of parts may be resorted to without departing from the spirit of the invention or the scope of the subjoined claims.

Having described my invention, I claim:

1. A tire flap comprising a strip having non-elastic marginal portions and an elastic central portion.

2. A tire flap comprising a strip having nonelastic marginal portions of reduced flexibility and a highly elastic flexible central portion.

3. A tire flap comprising a strip of highly elastic rubber provided with fabric strips covering only the marginal portions of the rubber strip.

4. A tire flap comprising a strip of rubber having tapered outer edges, and fabric strips secured to the marginal portions of said rubber strip, the inner edges of said fabric strips being spaced apart a substantial distance.

5. A tire flap comprising a substantially V-shaped strip of rubber tapered to decrease in thickness toward its outer edges, fabric strips secured to the marginal portions of said rubber strip, the inner edges of said fabric strips being spaced apart a substantial distance, and a compressible rubber block arranged in the angle of said strip between the inner edges of said fabric strips, said block being provided with an opening substantially equal in diameter to and adapted to receive a tire valve.

6. A tire flap comprising a strip of elastic rubber tapered to decrease in thickness toward its outer edges, and a strip of stiffening material united with said rubber strip adjacent each edge thereof, the inner edges of said stiffening strips being spaced apart a substantial distance.

In testimony whereof I affix my signature in presence of two witnesses.

DENNIS R. DIXON.

Witnesses:
J. T. JOBE, Jr.,
H. D. HOSIER.